Inventors: Richard R. Hughes
Charles V. Sternling
Charles E. Sanborn
By: Oswald H. Milmore
Their Attorney

United States Patent Office 2,751,756
Patented June 26, 1956

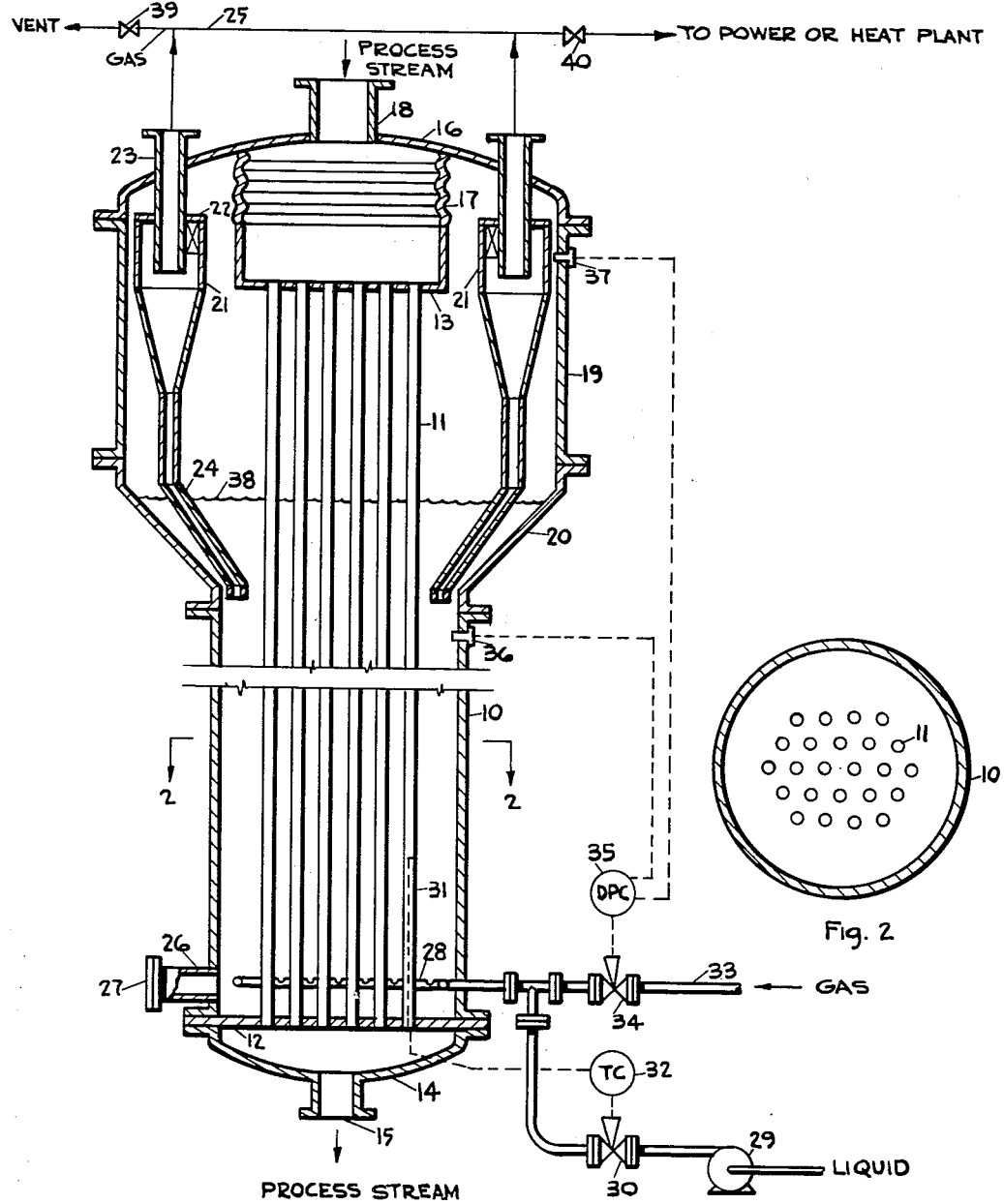

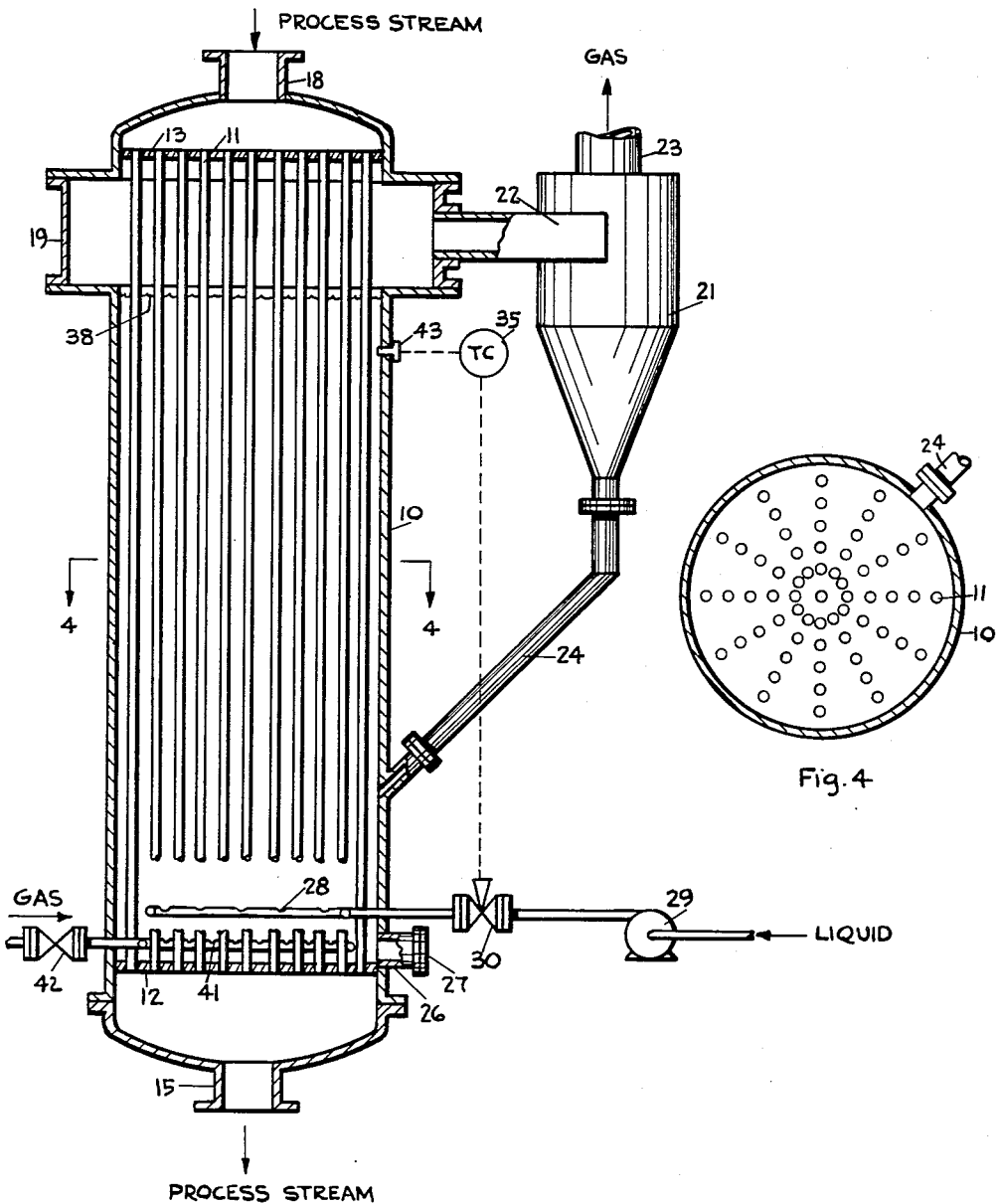

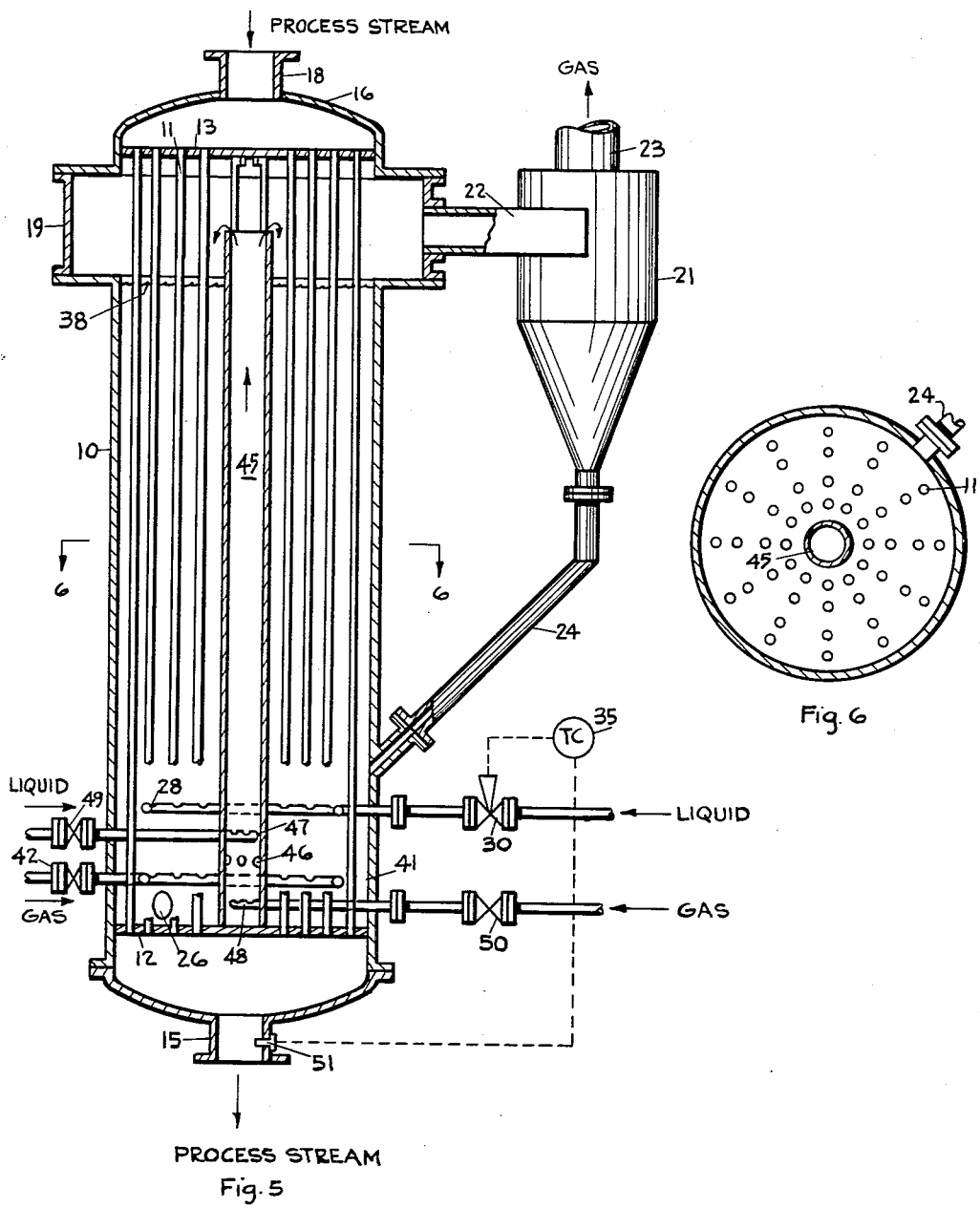

2,751,756

COOLING WALLS WITH FLUIDIZED SOLIDS AND LIQUID VAPORIZATION

Richard R. Hughes, San Anselmo, Charles V. Sternling, Oakland, and Charles E. Sanborn, Concord, Calif., assignors to Shell Development Company, Emeryville, Calif., a corporation of Delaware Application January 26, 1953, Serial No. 333,234

13 Claims. (Cl. 62—2)

The invention relates to an improved method and apparatus for cooling heat-transfer walls of any shape, particularly heat-conductive walls of chemical reactors, wherein heat is transferred from such wall to heat-transmitting solids maintained in a fluidized state and in contact with the wall. The invention finds especial although not exclusive application for controlling the temperature of reactants undergoing exothermic reactions within a reaction vessel, the latter being advantageously in the form of tubes through which the reacting mixture flows.

In many processes it is desired to effect cooling of a heat-transfer wall to maintain the latter at a desired temperature while avoiding localized over-cooling. The condition of substantially uniform wall temperature of reactor tubes within which an exothermic reaction is carried out in usually approached by surrounding the tubes with a cooling jacket containing a boiling liquid, and selecting the liquid and adjusting the pressure in the jacket to cause boiling at the required temperature which must be lower than the desired wall temperature to a degree dependent upon the heat-transfer rate from the wall to the fluid in the jacket. In some cases this method does not operate satisfactorily for one or more of the following reasons:

1. Heat flux, that is, the rate of heat flow between the wall and the cooling fluid per unit area, dictated by the conditions within the reactor, is in some cases or at certain times too low to cause nucleate boiling of the cooling liquid over all of the wall area. This may then limit the cooling operation to free convection of liquid over the wall and with evaporation at the upper surface of the liquid as opposed to nucleate boiling. Even with a small amount of boiling at levels beneath the surface, the fraction of vapor present in the cooling jacket may at times become so low (as when the rate of heat release in the reactor drops) that the surface of the cooling liquid falls so that parts of the reactor tubes are no longer immersed.

2. The static head in the cooling jacket is too high, particularly when long vertical tubes are used. This results in an appreciable change in boiling temperature of the cooling liquid with height. Since the static head depends upon the fraction of vapor present in the liquid, this change in boiling temperature is variable and is accentuated by low heat flux as mentioned in the foregoing paragraph.

3. The desired temperature may necessitate the use of liquids that are expensive or difficult to handle, or the use of inconvenient pressures.

It is an object of this invention to provide an improved method and apparatus for cooling heat-transfer walls that avoid the foregoing difficulties. More particularly, objects are to cool such walls while achieving some or all of the following conditions:

(1) A uniform temperature of the cooling medium within the jacket, resulting in a more uniform reactor wall temperature.

(2) A high rate of heat transfer between cooling medium and the wall, permitting the former to be kept at a temperature closer to the desired temperature of the latter and thereby tending toward more uniform wall temperatures despite low heat flux due to inside resistance or slow rate of chemical reaction.

(3) Facility for adjusting the temperature, either manually at intervals or automatically and continuously without changing the pressure in the jacket.

(4) The possibility of using inexpensive liquids, such as water, at low pressures, such as atmospheric or only low superatmospheric pressure.

(5) Avoidance of the possibility of vapor blanketing due to collection of gas in pockets on the heat-conductive wall.

(6) Lower costs in maintaining the heat-transmitting solids in a fluidized state.

(7) Subdivision of the cooling jacket into separate upflow and downflow chambers and provision for controlling the rate of circulation of heat-transmitting solids through these chambers, whereby a longitudinal temperature gradient can be maintained and controlled, such a condition being desirable for some chemical reactions.

(8) Convenient waste heat utilization by arranging the system so that steam or other gas generated in the cooling jacket is produced at any desired pressure with a considerable degree of superheat for operating power engines or to generate steam or preheat reagents by heat exchange.

(9) High thermal inertia, which quickly damps out the effect of fluctuations in the reactor temperature or in the feed rate of the coolant.

In summary, according to the invention, a fluidized bed of heat-transmitting solids is maintained in contact with the heat-conductive wall to be cooled and there is admitted to a lower part of the fluidized bed a liquid having a vapor pressure at the lowest wall temperature in excess of the pressure prevailing at the point of liquid admission, preferably an excess of more than 20% of said pressure up to many times said pressure, thereby vaporizing the liquid, and the resulting gases are flowed upwards through the bed to cool the heat-transmitting solids. The said gas, in flowing upwards, constitutes all or part of the fluidizing gas that serves to maintain the bed in a fluidized state, i. e., an auxiliary fluidizing gas may or may not be added depending upon the particular operating conditions, such as the heat flux and the total volumetric quantity of fluidizing gas required, taking into account the size of the heat-transmitting solids, the shape and size of the apparatus, etc. The temperature of the fluidized bed is controlled by controlling the rate of liquid admission. The temperature of different parts of the fluidized bed may be controlled as desired to be either substantially uniform or to provide a vertical temperature gradient; the former occurs when the reactor cooling jacket, which is herein called a fluidization vessel, has no partitions that segregate ascending and descending particles, although baffles, grids, and the like may be present, while the latter occurs when a partition wall, such as a large tube, subdividing the fluidization vessel into upflow and downflow chambers is provided, together with means for causing orderly circulation of the solids.

By thus injecting a liquid into the bed of heat-transmitting solids and vaporizing the liquid in the bed it becomes possible to effect a control of the bed temperature by simply varying the rate of liquid admission, since the cooling is largely due to the heat of vaporization of the liquid. The initial temperature of the liquid, of course, has some effect but this is minor. A particular advantage of this is that the temperature of the solids in the fluidization vessel may be varied as required without making a corresponding change in pressure within the vessel, such as is required when a liquid is vaporized at equilibrium conditions in a cooling jacket as described earlier herein. The control of the cooling process is thereby simplified considerably whilst further making it practicable to select a pressure with a view to useful utilization of the gas which is generated by the vaporization of the liquid and later withdrawn from the top of the bed, e. g., as steam that may be superheated to any desired extent. In prior processes wherein the pressure in the cooling jacket was varied this was practicable only by reducing the pressure of the exit steam to the lowest pressure likely to be used within the jacket, corresponding to the lowest expected temperature; this resulted in a waste of energy. The invention is not, of course, limited to operating at constant pressure.

Another important advantage over the use of an ordinary fluidized bed for cooling wherein all of the fluidizing gas is introduced into the bed as a gas resides in the greater operating economy. A large part of the energy consumed in the usual installation for maintaining solids in the fluidized state is expended as compression work. By injecting liquid into the bed only low power expenditures are required for pumping the liquid, since the gas generated by vaporization of the liquid constitutes all or a great part of the total fluidization gas required.

Fluidized beds have inherently high heat-transfer coefficients, e. g., 25 to 100 B. t. u. per sq. ft. per degree F. per hour, and the solid particles thereof come into effective contact with all parts of the area of the heat conductive wall. These phenomena often make it possible to operate with a smaller temperature difference between the wall and fluidized solids than in the case of boiling liquid in cooling jackets, thereby reducing the chances of localized over-cooling; further, they prevent the occurrence of localities on the surface of the heat-conductive wall that are not effectively cooled, such as is encountered in ordinary cooling jackets when gas pockets blanket parts of the wall and prevent effective transfer of heat from the wall to the cooling fluid. Experience has shown that erosion of the walls of the reactor tubes need not be serious.

The heat-transmitting solids are in most cases graded sand particles, the bed being advantageously free from particles differing widely from the mean particle diameter. Sand is preferred although other solids, such as metal oxides of the type used as catalysts may be used. By avoiding the use of extremely fine particles the recovery of the solid from the exit gas is facilitated, while excessively large particles require excessively high upward gas velocities to maintain a fluidized condition. Without limiting the invention thereto, it may be stated that graded sand having particle diameters from about 0.005 to 0.10 inch is preferred. Thus, a typical sand may consist of particles 95% of which have diameters above 0.007 inch and below 0.10 inch.

A "fluidized bed" is a mass of solid particles in a state of hindered settling in a gas, the mass exhibiting liquid-like mobility, a hydrostatic pressure and an observable upper free surface boundary. A "turbulent fluidized bed" is a fluidized bed wherein the mobility of the mass is is such that mixing takes place. Such beds are also known as dense fluidized bed and a dense turbulent fluidized bed, respectively. A "dispersed suspension" is a mass of solid particles suspended in a current of gas rising past the particles, which differs from a fluidized bed in that an upper level or interface is not formed under conditions of solids entrainment and uniform superficial velocity. Such a bed is also known as a dilute suspension to distinguish it from dense fluidized beds. For further details on the natures of these beds and the definitions of the terms, see "Fluidization Nomenclature and Symbols," Industrial and Engineering Chemistry, vol. 41, pp. 1249–1250, June, 1949.

The term "gas" is used in this specification to include substances sometimes called vapor.

Having now indicated the nature of in the invention in a general way, reference is made to the accompanying drawings forming a part of this specification and illustrating by way of example certain preferred specific embodiments of the apparatus suitable for carrying the method, wherein:

Figure 1 is a vertical sectional view of a reactor constructed in accordance with the invention;

Figure 2 is a sectional view taken on the line 2—2 of Figure 1;

Figure 3 is a vertical sectional view of a modified reactor;

Figure 4 is a sectional view taken on the line 4—4 of Figure 3;

Figure 5 is a vertical sectional view of another modified reactor wherein separate upflow and downflow chambers are provided;

Figure 6 is a sectional view taken on the line 6—6 of Figure 5;

Figures 7, 8:
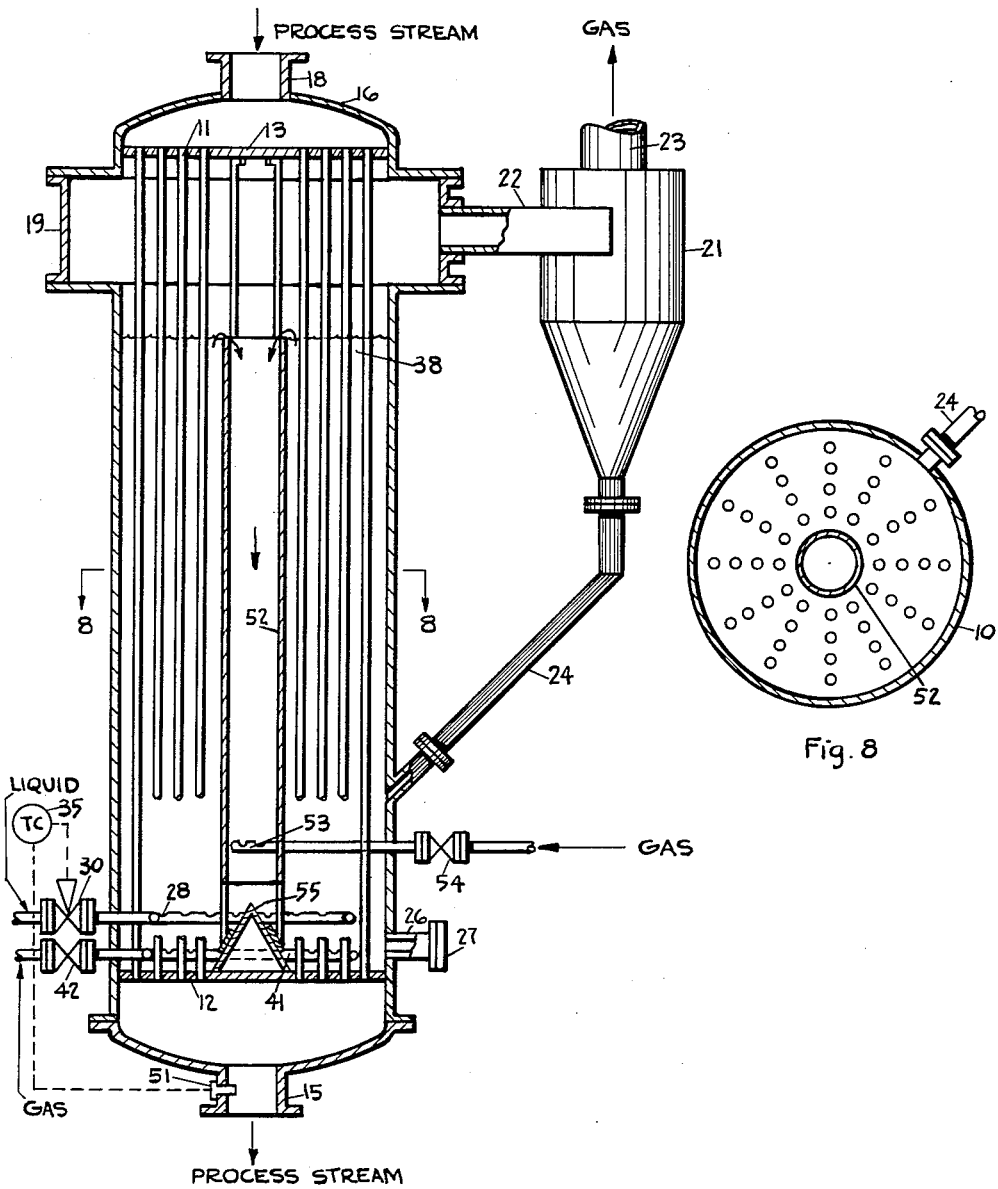
Figure 7 is a vertical sectional view of still another modified reactor having separate upflow and downflow chambers.
Figure 8 is a sectional view taken on the line 8—8 of Figure 7.

Referring to Figures 1 and 2, 10 is an upright shell forming a fluidization vessel or chamber that is bounded in part by vertical reaction tubes 11 that are contained in the shell and the heat-conductive walls of which are to be cooled. These tubes collectively constitute the reaction vessel and may be sealed at the ends thereof in tube sheets 12 and 13, both sealed to the shell. The lower sheet 12 is clamped between the flanged lower end of the shell and a dome or closure 14 having a duct 15 and the upper sheet 13 may, if desired, be sealed to the upper dome or closure 16 of the shell by an expansion joint, such as a corrugated bellow-like section 17, a duct 18 being provided in the upper dome. The process stream, e. g., reactants undergoing an exothermic reaction, are passed either upwards or downwards through the tubes 11 by means of the ducts 15 and 18. The shell has an upper enlarged section 19 connected to the lower part by a frusto-conical section 20 and within which are mounted a plurality of gas-solids separating cyclones 21 having tangential inlets 22, gas outlets 23 and dip-legs 24 for the return of solids into the fluidized bed, to be described. The gas outlets 23 may be connected to any suitable conduit or manifold 25 for utilization of the gas. An opening 26, normally closed by a cover 27, may be provided for charging, replenishing or removing sand to serve as the heat-transmitting solids.

The lower part of the fluidization vessel has a distributing head 28, such as a gridwork of interconnected pipes with suitable perforations, to which liquid, such as water, may be admitted from a pump 29 at a rate controlled by a flow control valve 30. The valve 30 is operated to admit a greater quantity of liquid upon a rise in the temperature within the reaction tubes. According to a desirable, although optional, arrangement the valve is operated automatically. To this purpose a temperature-sensing element 31 is provided at a suitable point in one or more of the tubes (preferably the outlet end), and a valve actuating element 32, such as a temperature controller, is interconnected between the element 31 and the valve 30 to operate the latter in accordance with variations in the temperature within the reaction tube.

Provision may also be made for supplying auxiliary fluidizing gas into the fluidization vessel when needed, e. g., during start up when the solid particles are not sufficiently heated to vaporize the liquid, and/or when the heat flux is too low. This gas admission means may be in addition to or combined with the liquid admission device described above, and only the latter embodiment is shown in the drawing. Thus, steam or other gas such as air at suitable pressure from a supply pipe 33 is fed via a flow control valve 34 into the distributing head 28. Automatic operation of the valve 34 may be achieved, if desired, by providing a differential pressure controller 35 for actuating the valve and connecting it to pressure-sensing elements 36 and 37 situated at different levels in the fluidization vessel, at least one of these being below the level of the fluidized bed. When the fluidized bed in the fluidizing chamber is up to the desired level 38 the pressure difference between the elements 36 and 37 is sufficient to restrict or shut off the admission of steam; when the level of the bed falls this pressure difference becomes smaller, and the controller 35 is set to open the valve 34 progressively to increase the flow of fluidizing gas and re-establish the height of the bed.

In operation the reactants are admitted through duct 18 and withdrawn through the duct 15 (or vice versa) and flow through the reaction tubes 11 that constitute the reaction vessel. The fluidization vessel having been previously charged with heat-transmitting solids, such as graded sand, steam may be initially admitted from the pipe 33 through the valve 34 and distributor 28 to fluidize the solids. The solids thereby are brought into a state of hindered settling in the ascending steam up to the upper level 38 and in contact with the heat-conductive walls of the tubes 11. Steam is withdrawn from the top of the bed and flowed through the enlarged upper section at reduced velocity. It is then passed through the cyclones 21 wherein it is freed from entrained solids and discharged into the manifold 25.

When the tubes 11 are heated by the reactants therein sufficiently to actuate the temperature controller 32, water is supplied by the pump 29 through the valve 30 and distributor 28. The solid particles of the fluidized bed, being in contact with the tubes, become heated and the water is brought into direct contact with the heated solids; the water is thereby vaporized to generate steam, which ascends through the fluidization vessel as fluidizing gas. This augments the flow of fluidizing gas, increasing the pressure difference between the pressure-sensing elements 36 and 37 and causing the differential pressure controller 35 to shut off or reduce the admission of steam. The water cools the solids which, in turn, absorb heat from the tube walls. The temperature of the fluidized bed is substantially the same at all points thereof, save in the immediate vicinity of the distributor 28 whereat a somewhat lower temperature prevails. It is in good heat exchange relationship with all parts of the areas of the tubes below the level 38.

During the start-up phases the valve 39 in the discharge manifold 25 may be kept open to vent the steam and the fluidization vessel operated at low or substantially atmospheric pressure so as to reduce the compression costs for the steam admitted from the pipe 33. After the unit is in operation this valve may be closed and the valve 40 opened to direct the steam to a suitable power or heat plant, e. g., a turbine or heat exchanger, that may be operated at any desired pressure. The pressure within the fluidization chamber should, however, not be so high that condensation of liquid occurs within the fluidized bed; preferably the pressure is sufficiently low so that the vapor pressure of the water or other liquid for the lowest temperature of the tubes 11 is at least 20% greater than the pressure of the bed at the distributor 28.

The fluidized bed normally has a fraction of voids between about 0.30 and 0.80. This suspension should be distinguished from a fixed bed or a quiescent fluidized bed wherein little or no mixing of the particles takes place and wherein lower heat-transfer coefficients with respect to the heat-conductive wall prevail. To attain high heat transfer coefficients it is desirable to maintain a state of turbulence or mobility such that the particle Reynolds number it at least 2 and, preferably, above 5. The particle Reynolds number is a dimensionless number defined by the formula:

$$\frac{Du\rho}{\mu}$$

wherein D is the particle diameter, $u$ is the velocity of the particle with respect to the ascending fluidizing gas, $\rho$ is the density of the gas and $\mu$ is the viscosity of the gas, all in consistent units.

The reactor can, for example, be used for the production of ethylene oxide, wherein the external wall temperature of the tubes 11 is about 500° F. and the exit temperature of the steam may be about 490° F. The pressure at the top of the fluidization vessel may be atmospheric, producing highly superheated steam, or any desired superatmospheric pressure not in excess of about 548 lbs. per sq. in., abs., so the the pressure at the distributor will not exceed 567 lbs. per sq. in., assuming a fluidized bed 35 ft. in height with a pressure drop of 19 lbs. per sq. in.

Referring to Figures 3 and 4, wherein like reference numbers denote like or corresponding parts, and illustrating certain modifications, the shell 10 has the upper enlarged section 19 somewhat smaller and the cyclone 21 is situated outside of the shell. Fluidizing gas is taken off above the bed level 38, passed through the cyclone, and discharged through the outlet 23 to any point of utilization. Solids from the cyclone are returned to the lower part of the fluidization vessel through the return leg 24.

The liquid and fluidizing gas are in this embodiment admitted through different inlets, the former flowing from the pump 29 through the valve 30 and distributor 28. A separate distributor 41 is provided at the bottom of the vessel for distributing steam or other fluidizing gas admitted through a valve 42. For automatic operation of the valve 30, a temperature-sensing element 43 and temperature controller 35 may be provided. The element 43 differs from the element 31 of the prior embodiment in that it senses the temperature of an upper part of the fluidized bed.

The operation of the embodiment according to Figures 3 and 4 is similar to that previously described save that the valve 42 is operated manually.

Figures 5 and 6 show the use of a partition for segregated upflow and downflow of solids. The structure is similar to that described for Figures 3 and 4, and again like numbers denote like or analogous parts. The fluidization vessel has a central tube 45 constituting a partition wall dividing the vessel into a central upflow chamber and an annular downflow chamber. The tube 45 terminates short of the top of the vessel so as to place these chambers into free communication at the top. It has a plurality of holes 46 near the bottom to provide communication between these chambers also at the bottom. The liquid distributor 28 and gas distributor 41 are situated in the annular, downflow chamber. Additional distributors 47 and 48 for liquid and gas, respectively (which may be simple nozzles), are situated at the bottom of the upflow chamber, at least one, preferably the gas distributor, being situated below the holes 46. These distributors are provided with flow control valves 49 and 50, respectively, and may be connected to the same sources of supply, e. g., water and steam, as the valves 30 and 42, respectively. The valve 30 is actuated by a temperature controller that is connected to a temperature-sensing element 51 situated in the exit duct 15 to sense the temperature of the reactants, although this element may, if desired, be located in one of the tubes or in the fluidization chamber, as shown for the elements 31 and 43, respectively, of Figures 1 and 3.

The operation of this embodiment differs from those previously described in that the heat-transmitting solids ascend through the upflow chamber within the tube 45 as a dispersed suspension in fluidizing gas admitted through the distributor 48 and/or generated by vaporization of liquid admitted through the distributor 47. In general, it will be desirable in this embodiment to admit some gas through the distributor 48 under all or most operating conditions so as to afford control of the solids circulation rate, as described below. The minimum upward velocity of the fluidizing gas within the upflow chamber is the terminal settling or balancing velocity for a single particle of the heat-transmitting solids; this velocity is determined mainly by the particle size, the particle density and the gas density. In general, the gas velocity is advantageously somewhat above this minimum and velocities at least 16 ft. per second will normally be used, the horizontal dimensions of the tube 45 being chosen with a view to attaining such a velocity with a reasonably low quantity of gas; in most cases it is desirable to attain higher velocities, e. g., preferably about 26 to 40 ft. per sec. in the case of particles such as sand having diameters within the range 0.005 to 0.05 inch, and still higher velocities, such as 100 ft. per sec. may be used, particularly with solids of larger diameters. By using higher velocities pulsations and irregular movements of solids in this chamber are avoided. By way of illustration, it is usually advantageous to have the gas velocity above 1.1 times the terminal settling velocity when the weight ratio of solids to gas in the ascending suspension is 10, above 1.6 times the terminal settling velocity when the weight ratio is 60, and so on following a linear relation. However, excessive pressure drops are avoided by operating not too far above this minimum, e. g., not above 4.0 times the terminal settling velocity. The dispersed suspension produced as described above has a large fraction of voids, usually well above 0.85, e. g., 0.88 to 0.99, depending, inter alia, upon the weight ratio of solids to gas.

The suspension emerges from the top of the tube into the enlarged section 19 within which most of the particles settle downwardly into the annular downflow chamber. The gas, together with fluidizing gas ascending in the downflow chamber, flows via inlet 22 into the cyclone 21 and is discharged through outlet 23 for utilization, as previously described, the pressure being similarly maintained. The particles descending through the downflow chamber are maintained in a fluidized state by fluidizing gas admitted through the distributor 41 and/or generated by vaporization of liquid admitted through the distributor 28, thereby insuring good heat transfer between the tubes 11 and the solid particles. The temperature gradient within the downflow chamber may be controlled by regulating the rate of circulation of the solids by means of the valves 49 and 50. When both of these are closed no circulation occurs and the conditions within the upflow chamber are as previously described for Figures 1 and 2, i. e., the temperature within the bed is substantially uniform from a level slightly above that of the liquid admission point 28 to the upper level 38 of the fluidized bed. By admitting more gas through the valve 50 and distributor 48 the rate of circulation of solids is increased, thereby causing a temperature gradient within the downflow chamber and permitting the degree of cooling at different longitudinal points of the reaction tubes 11 to be varied. The gradient becomes steeper with increasing circulation rates.

The nature of this gradient within the fluidized bed in contact with the tubes 11 will depend upon the manner in which liquid is admitted into the unit for vaporization. Thus, when all of the liquid is admitted into the bottom of the downflow chamber through distributor 28 the bottom will be the coolest. When all of the liquid is admitted into the bottom of the upflow chamber through distributor 47, the top of the bed will be the coolest (in this case fluidization gas must be injected through distributor 41 while gas from the distributor 48 may be unnecessary, provided the latter is below the holes 46). Liquid may also be injected into both distributors 28 and 47 to make the intermediate part of the fluidized bed the warmest.

While we have shown a preferred arrangement wherein the upflow chamber is disposed centrally within the fluidization vessel, it is evident that the invention is not limited thereto, and that other arrangements are possible.

Further, it is possible to modify the apparatus by placing the tubes in the upflow chamber. Such an arrangement is shown in Figures 7 and 8 wherein again like reference numbers denote parts corresponding to those previously described. The fluidization chamber contains a central tube 52 constituting a partition wall and defining within itself a downflow chamber. This tube extends only partly to the top of the uniform diameter section of the fluidization vessel so that solids from the fluidized bed, which extends to the level 38, can enter it. A distributor or nozzle 53 is situated near the bottom of the tube 52 for the admission of gas such as steam or air to control the rate of solids circulation, the gas flow rate being controlled by a valve 54. The tube terminates above the tube sheet 12 and a deflecting cone or baffle 55 is mounted thereon beneath the tube to distribute the solid particles into all directions into the bottom of the annular upflow chamber surrounding the tube.

Operation of the device according to Figures 7 and 8 is as follows: When the valve 54 is opened sufficiently to prevent any appreciable amount of heat-transmitting solids from descending through the downflow chamber within tube 52, the operation of the device is precisely as was described previously for Figures 1–4. By reducing the flow of gas through the valve 54 the solids descend through the downflow chamber and are deflected by the deflector 55 into the bottom of the fluidized bed in the annular chamber. Circulation is thereby set up, causing a temperature gradient in the fluidized bed in contact with the tubes 11.

We claim as our invention:

1. A method of cooling a process stream comprising the steps of flowing said process stream in contact with one side of a heat-conductive wall and thereby transferring heat from said material to said wall; maintaining in contact with the other side of said wall a fluidized bed of heat-transmitting solids and thereby effecting heat transfer from the wall to said solids; admitting to direct contact with said solids a liquid having a vapor pressure that exceeds the pressure at the point of liquid admission for the lowest temperature of said wall and thereby effecting total vaporization of the said liquid; flowing the resultant gas upwards through the bed as fluidizing gas to maintain the solids in a fluidized state and to cool said solids; and discharging the gas from above the fluidized bed.

2. Method according to claim 1 wherein said liquid is admitted to the bottom of the said fluidized bed and in sufficient quantity to maintain the bed in a fluidized state solely by the said resultant gas.

3. Method according to claim 1 wherein an auxiliary fluidizing gas is admitted under pressure into a lower part of the bed to aid in maintaining the bed in a fluidized state during low rates of liquid admission.

4. Method according to claim 1 wherein said liquid has a vapor pressure at the conditions specified that exceeds the said pressure at the point of liquid admission by at least 20%.

5. Method according to claim 1 wherein the liquid is water.

6. Method according to claim 1 wherein the bed is maintained at a superatmospheric pressure.

7. In a method of carrying out an exothermic chemical reaction within a vessel having a heat-conductive wall, the improvement of controlling the reaction temperature by maintaining a bed of fluidized heat-transmitting solids in contact with the outer surface of said vessel wall and thereby effecting heat transfer from the wall to the said solids; admitting into a lower part of said fluidized bed for direct contact with said solid a liquid having a vapor pressure that exceeds the pressure of the bed at the point of liquid admission for the lowest temperature of said outer surface of the wall, thereby vaporizing the liquid; flowing the resultant gas upwards through the bed as fluidizing gas to maintain the solids in a fluidized state and to cool said solids; discharging the gas from above the fluidized bed; and controlling the temperature of said wall by varying the rate of admission of liquid.

8. Method according to claim 7 wherein the pressure in said fluidized bed is kept substantially constant for different rates of liquid admission.

9. Method of cooling a vertically elongate heat-conductive wall comprising the steps of flowing finely divided heat-transmitting solids as a suspension in an ascending fluidizing gas stream upwards through a first confined vertical chamber; separating the solids from the gas after upward flow through said chamber; admitting the separated solids to the top of a second, confined vertical chamber; flowing the said admitted solids downwardly through said second chamber countercurrently to an ascending fluidizing gas as a fluidized bed and in contact with the said heat-conductive wall and thereby effecting heat transfer from the wall to said solids; returning the solids after downward flow through the second chamber to the bottom of the first chamber; admitting into a lower part of said second chamber a liquid having a vapor pressure that exceeds the pressure at the point of liquid admission for the lowest temperature of said wall and bringing the admitted liquid into direct contact with the solids therein, thereby vaporizing the liquid; and flowing the gas resulting from said vaporization through said second chamber to form at least a portion of the said fluidizing gas therein to cool the said solids.

10. Method of cooling a vertically elongate heat-conductive wall comprising the steps of flowing finely divided heat-transmitting solids upwards through a first confined vertical chamber as a suspension in an ascending fluidizing gas stream and in contact with said heat-conductive wall and thereby effecting heat transfer from the wall to said solids; separating the solids from the gas after upward flow through said chamber; admitting the separated solids to the top of a second, confined chamber; flowing the admitted solids downwards through said second chamber; returning the solids after downward flow through the second chamber to the bottom of the first chamber; and admitting into the lower part of at least one of said chambers a liquid having a vapor pressure that exceeds the pressure at the point of liquid admission for the lowest temperature of said wall and bringing the admitted liquid into direct contact with solids therein, thereby vaporizing the liquid; and flowing the gas resulting from said vaporization upwards through one of said chambers as fluidizing gas and to cool the said solids.

11. Method according to claim 10 wherein said liquid is admitted at least into the first chamber and the gas resulting from the vaporization thereof is flowed upwards through said first chamber.

12. Apparatus for carrying out chemical reactions comprising a reaction vessel having a heat-conductive wall; a fluidization vessel defining a confined chamber bounded at least in part by said heat-conductive wall and adapted to contain heat-transmitting solids as a fluidized bed in contact with said wall; liquid admission means in a lower part of said fluidization vessel; flow-control means for controlling the rate of admission of liquid; gas outlet means at the top of said fluidization vessel for discharging gas resulting from vaporization of said liquid after upward flow through said heat-transmitting solids, temperature-sensing means disposed to sense the temperature in said reaction vessel; and actuating means interconnected between said temperature-sensing means and said flow-control means for operating the latter in accordance with variations in temperature in said reaction vessel.

13. Apparatus for carrying out chemical reactions comprising a reaction vessel having a vertically elongate heat-conductive wall; a fluidization vessel defining a confined chamber, said vessel having an upright partition wall subdividing the vessel into separate upflow and downflow chambers communicating with each other at the top and bottom of the vessel, and said heat-conductive wall bounding at least a part of at least one of said chambers, whereby heat-transmitting solids present as a fluidized bed in said chambers will contact said wall; means for admitting fluidizing agents into the lower parts of both of said chambers, said means including a liquid inlet pipe and flow-control means for controlling the rate of liquid admission; and gas outlet means at the top of said fluidization vessel for discharging gas resulting from vaporization of said liquid after upward flow through said heat-transmitting solids.

References Cited in the file of this patent

UNITED STATES PATENTS

| | | |
|---|---|---|
| 2,506,317 | Rex | May 2, 1950 |

FOREIGN PATENTS

| | | |
|---|---|---|
| 587,774 | Great Britain | May 6, 1947 |